(12) United States Patent
Bessette et al.

(10) Patent No.: US 7,437,936 B1
(45) Date of Patent: Oct. 21, 2008

(54) WINDOW FOR MEASURING DEVICE

(75) Inventors: Tyler Jon Bessette, Milford, CT (US); Christian Miles Blatherwick, Milford, CT (US)

(73) Assignee: Ashcroft, Inc., Stratford, CT (US)

( * ) Notice: Subject to any disclaimer, the term of this patent is extended or adjusted under 35 U.S.C. 154(b) by 0 days.

(21) Appl. No.: 11/823,172

(22) Filed: Jun. 27, 2007

(51) Int. Cl.
*G01L 7/00* (2006.01)

(52) U.S. Cl. ...................... 73/700; 361/283.1
(58) Field of Classification Search ........... 73/700–756; 361/283.1–283.4
See application file for complete search history.

(56) References Cited

U.S. PATENT DOCUMENTS

| | | | |
|---|---|---|---|
| 4,196,634 A * | 4/1980 | Hehl | 73/756 |
| 4,420,981 A * | 12/1983 | Schoen | 73/756 |
| 4,753,112 A | 6/1988 | Wetterhorn | |
| 5,913,447 A | 6/1999 | Carpenter | |
| 6,556,418 B2 * | 4/2003 | Aigner et al. | 361/283.1 |
| 6,679,122 B2 | 1/2004 | Blake et al. | |

* cited by examiner

*Primary Examiner*—Edward Lefkowitz
*Assistant Examiner*—Jermaine Jenkins
(74) *Attorney, Agent, or Firm*—McCarter & English, LLP

(57) ABSTRACT

The present disclosure provides for systems and methods for fabricating measuring devices, e.g., a pressure gauge, thermometer or the like. More particularly, the present disclosure provides for systems and methods for fabricating a window for use with a measuring device assembly. In one embodiment, the present disclosure provides for improved systems and methods for fabricating measuring device assemblies having a window where the window does not substantially move or shift during or after assembly, thereby reducing or eliminating the risk that the window may leak or crack during or after assembly.

20 Claims, 4 Drawing Sheets

WINDOW FOR MEASURING DEVICE

BACKGROUND

1. Technical Field

The present disclosure relates to a measuring device assembly and method for fabricating measuring device assemblies and, more particularly, to a method for fabricating a window for use with a measuring device, e.g., a pressure gauge, thermometer or the like.

2. Background Art

Measuring devices, such as instruments and gauges used for measuring temperature and pressure, have innumerable uses in industry. Price and quality competition between the various manufacturers are factors in the marketplace. Therefore, a savings in the cost of material, labor and the like by a manufacturer can have a significant effect on that manufacturer's sales, market share and margins. Therefore, a constant need exists among these manufacturers to develop more effective manufacturing techniques.

For example, pressure gauges to measure the pressure of process media are well known. Pressure gauges are useful in a myriad of different environments for commercial and industrial applications. Typically, pressure gauges measure pressure and provide an indication of the value. Pressure values are usually displayed in analog form (e.g., by a pointer) or in digital form (e.g., by an electronic readout).

Measuring devices, e.g., pressure gauges or thermometers, sometimes include a window. Windows for measuring devices are known. Some manufacturers produce measuring devices with various window sizes, and with various materials. For example, windows for measuring devices are sometimes used where a viewable window is required to see the readout of the measuring device and where that readout needs to be protected by a window material. In general, one issue encountered with measuring devices having a window is that the window may move or shift during or after assembly, causing various problems, e.g., leakage issues, non-uniform compression on the window material which may lead to window cracking, etc. For example, some measuring devices have a removable ring on the front of the measuring device, and this ring may be used to hold the window material in place. Sometimes there is a gasket or gasket material under the window in order to seal the window to the case and attempt to make the measuring device leak tight. In an attempt to make this ring removable, there is sometimes a ramp or the like on either the ring or the case, and a mating feature on the adjoining part.

One problem is that the window is typically round, and in order for the window to fit in the ring, the window must be smaller than the inner diameter of the mating structure (e.g., cam) of the ring. Once the window passes the mating structure (e.g., cam), the window may be loose in the ring and may shift to one side. This shift can cause leak issues, and can also cause non-uniform compression on the window material when the ring is tightened, which can lead to window cracking.

Some measuring devices utilize an additional filler part in the measuring device assembly in an attempt to not allow this shifting and to attempt to alleviate the problems mentioned above. However, adding additional parts to the measuring device assembly increases the cost and complexity of the measuring device assembly. Other measuring devices stamp features into the ring in an attempt to not allow this shifting and to attempt to alleviate the problems mentioned above. However, such approaches increase manufacturing costs and generally do not allow for a uniform round ring in the measuring device assembly.

Thus, despite efforts to date, a need remains for improved systems and methods for fabricating measuring device assemblies having a window where the window does not substantially move or shift during or after assembly. These and other inefficiencies and opportunities for improvement are addressed and/or overcome by the systems and methods of the present disclosure.

SUMMARY

The present disclosure provides an advantageous measuring device assembly and method for fabricating advantageous measuring device assemblies. In exemplary embodiments, the present disclosure provides a method for fabricating a window for use with a measuring device assembly, e.g., a pressure gauge, thermometer or the like.

The present disclosure provides for a measuring device system including a case of a first measuring device that includes at least three first mating structures, a ring of the first measuring device that includes at least three second mating structures, a non-circular window element that defines an outer perimeter, the outer perimeter including at least three outwardly extending lobes and radially inward recess regions positioned between adjacent lobes, wherein at least the outer perimeter of the window element is sized to rest upon a mounting shelf associated with the ring, wherein each radially inward recess region is configured and dimensioned to allow the window element to bypass the at least three second mating structures associated with the ring, and wherein the at least three first mating structures of the case are releasably secured to the at least three second mating structures of the ring to releasably secure the ring to the case and to seal the window element between the mounting shelf and the case.

The present disclosure also provides for a measuring device system wherein the first measuring device is a pressure measuring device or a temperature measuring device. The present disclosure also provides for a measuring device system wherein the at least three first mating structures of the case are ramped mating structures, and wherein the at least three second mating structures of the ring are ramped mating structures.

The present disclosure also provides for a measuring device system wherein the case further comprises a gasketing material, and wherein the gasketing material forms a seal between the window element and the case when the at least three first mating structures of the case are releasably secured to the at least three second mating structures of the ring to releasably secure the ring to the case and to seal the window element between the mounting shelf and the case.

The present disclosure also provides for a measuring device system wherein the window element is glass. The present disclosure also provides for a measuring device system wherein the ring defines an inner perimeter, and wherein each outwardly extending lobe is configured and dimensioned to allow each lobe to be positioned substantially adjacent to the inner perimeter of the ring when the window element is rested upon the mounting shelf of the ring.

The present disclosure also provides for a measuring device system wherein each outwardly extending lobe is spaced equidistantly apart from each adjacent lobe with the radially inward recess regions positioned between adjacent lobes so that the radially inward recess regions are spaced equidistantly apart from each adjacent radially inward recess region. The present disclosure also provides for a measuring device system wherein the window element is symmetric.

The present disclosure also provides for a measuring device system wherein each outwardly extending lobe includes a lobe angular section and each radially inward recess region includes a recess angular section, and wherein the outer perimeter of the window element further comprises straight sections positioned between each lobe angular section of each outwardly extending lobe and each recess angular section of each radially inward recess region.

The present disclosure also provides for a method for manufacturing a measuring device system including providing a case of a first measuring device that includes at least three first mating structures, providing a ring of the first measuring device that includes at least three second mating structures, providing a non-circular window element that defines an outer perimeter, the outer perimeter including at least three outwardly extending lobes and radially inward recess regions positioned between adjacent lobes, wherein at least the outer perimeter of the window element is sized to rest upon a mounting shelf associated with the ring, and wherein each radially inward recess region is configured and dimensioned to allow the window element to bypass the at least three second mating structures associated with the ring, resting the outer perimeter of the window element upon the mounting shelf of the ring by bypassing the at least three second mating structures of the ring, and releasably securing the at least three first mating structures of the case to the at least three second mating structures of the ring, thereby releasably securing the ring to the case and thereby sealing the window element between the mounting shelf and the case.

The present disclosure also provides for a method for manufacturing a measuring device system wherein the first measuring device is a pressure measuring device or a temperature measuring device. The present disclosure also provides for a method for manufacturing a measuring device system wherein the at least three first mating structures of the case are ramped mating structures, and wherein the at least three second mating structures of the ring are ramped mating structures.

The present disclosure also provides for a method for manufacturing a measuring device system wherein the case further comprises a gasketing material, and wherein the gasketing material forms a seal between the window element and the case when the at least three first mating structures of the case are releasably secured to the at least three second mating structures of the ring to releasably secure the ring to the case and to seal the window element between the mounting shelf and the case. The present disclosure also provides for a method for manufacturing a measuring device system wherein the window element is glass.

The present disclosure also provides for a method for manufacturing a measuring device system wherein the ring defines an inner perimeter, and wherein each outwardly extending lobe is configured and dimensioned to allow each lobe to be positioned substantially adjacent to the inner perimeter of the ring when the window element is rested upon the mounting shelf of the ring.

The present disclosure also provides for a method for manufacturing a measuring device system wherein each outwardly extending lobe is spaced equidistantly apart from each adjacent lobe with the radially inward recess regions positioned between adjacent lobes so that the radially inward recess regions are spaced equidistantly apart from each adjacent radially inward recess region. The present disclosure also provides for a method for manufacturing a measuring device system wherein the window element is symmetric.

The present disclosure also provides for a method for manufacturing a measuring device system wherein each outwardly extending lobe includes a lobe angular section and each radially inward recess region includes a recess angular section, and wherein the outer perimeter of the window element further comprises straight sections positioned between each lobe angular section of each outwardly extending lobe and each recess angular section of each radially inward recess region.

Additional advantageous features, functions and applications of the disclosed systems and methods of the present disclosure will be apparent from the description which follows, particularly when read in conjunction with the appended figures.

BRIEF DESCRIPTION OF THE DRAWINGS

To assist those of ordinary skill in the art in making and using the disclosed systems and methods, reference is made to the appended figures, wherein.

DETAILED DESCRIPTION

Figure 1:
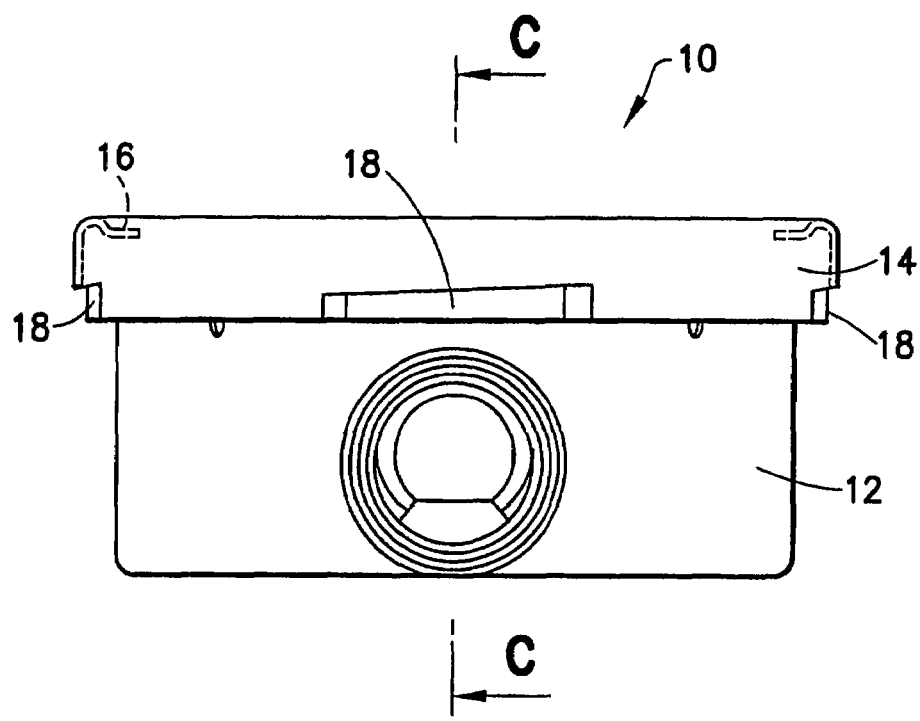
FIG. 1 is a side view of an exemplary measuring device assembly according to the present disclosure.

In the description which follows, like parts are marked throughout the specification and drawings with the same reference numerals, respectively. Drawing figures are not necessarily to scale and in certain views, parts may have been exaggerated for purposes of clarity.

The present disclosure provides for systems and methods for fabricating measuring devices, e.g., a pressure gauge, thermometer or the like. More particularly, the present disclosure provides for systems and methods for fabricating a window for use with a measuring device assembly. Generally, windows for measuring devices are sometimes used where a viewable window is required to see the readout of the measuring device and where that readout needs to be protected by a window element. Current practice provides for the risk that the window may move or shift during or after assembly of the measuring device, causing various problems, such as, for example, leaking and/or window cracking problems. The present disclosure provides for improved systems and methods for fabricating measuring device assemblies having a window where the window does not substantially move or shift during or after assembly, thereby reducing or eliminating the risk that the window may leak or crack during or after assembly.

For example, in the current art, some measuring devices have a removable ring on the front of the measuring device that is used to hold the window element in place. One problem with current practice is that the window element is typically round, and in order for the window element to fit in the ring, the window must be smaller than the inner diameter of the mating structure of the ring, and the window element therefore may be loose in the ring and may shift to one side once the window element passes the mating structure of the ring. This shift can cause leakage issues once the measuring device is assembled, and can also cause non-uniform compression on the window when the ring is tightened, which can lead to window cracking. In an exemplary embodiment, the present disclosure provides for a non-circular window for use with a measuring device, where the non-circular window does not substantially move or shift during or after assembly, thereby reducing or eliminating the risk that the window may leak or crack during or after assembly.

Referring now to the drawings, and in particular to FIG. 1, there is illustrated in one embodiment a measuring device 10 having a case 12 releasably secured to a ring 14. Typically, ring 14 is circular. Measuring device 10 may be a pressure measuring device, including, but not limited to, a pressure gauge, a pressure transducer or the like. In another embodiment, measuring device 10 is a temperature measuring device. However, pressure or temperature measuring devices are not the only measuring devices that could be used in accordance with the principles of the present disclosure, as will be readily apparent to persons skilled in the art from the description provided herein.

In one embodiment of the present disclosure, for example, measuring device 10 may be operatively coupled to a container such as a tank, a pipe, a pressurized reactor or the like in order to measure a condition to be measured, whether it be temperature, pressure or some other value, utilizing a measuring device mechanism, such as, for example, a Bourden tube or the like. The actual elements of the measuring device mechanism are not shown as they are conventional and do not form a part of the present disclosure.

Figure 2:
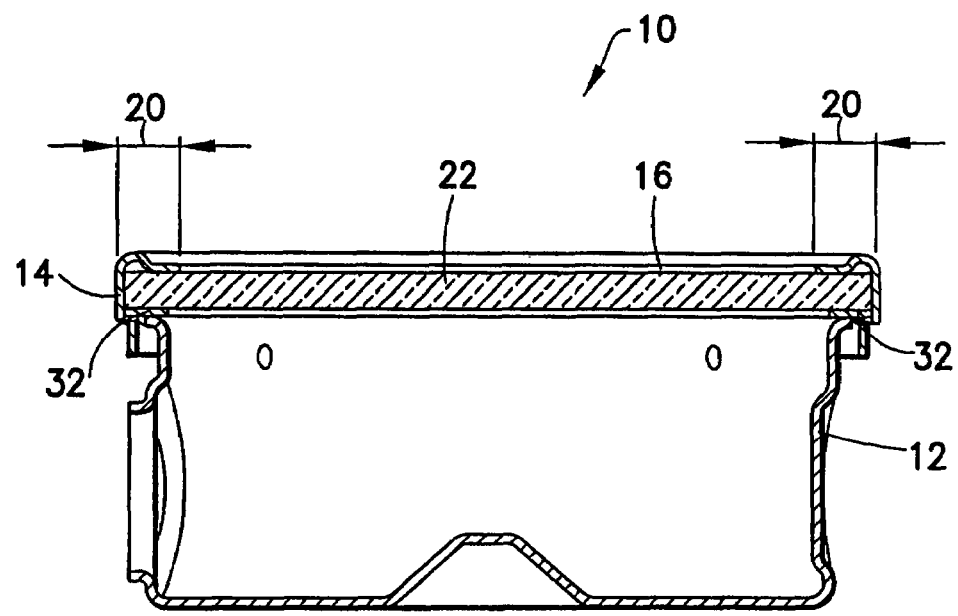
FIG. 2 is a sectional side view taken substantially along lines C-C of FIG. 1 according to the present disclosure.
Figure 3:
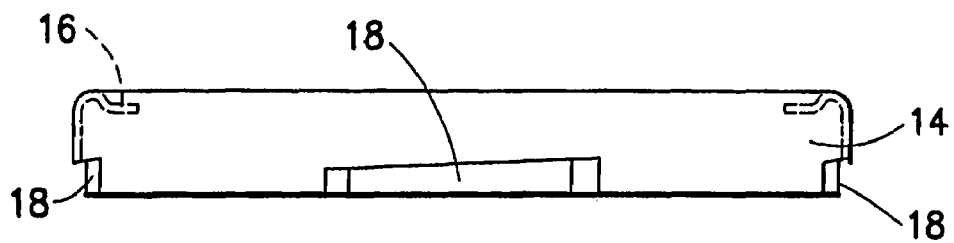
FIG. 3 is a side view of an exemplary ring of an measuring device assembly according to the present disclosure.

With reference to FIGS. 1, 2 and 3, ring 14 further includes a mounting shelf 16. In one embodiment, the mounting shelf 16 extends around ring 14 at or near the top side of ring 14 to form a mounting shelf 16 at or near the top side of ring 14. In one embodiment, the mounting shelf 16 extends radially around ring 14 at or near the top side of ring 14 to form a continuous, circular mounting shelf 16 at or near the top side of ring 14. As shown in FIG. 2, mounting shelf 16 also includes inward portion 20. Inward portion 20 of mounting shelf 16 extends inwardly from the outer perimeter of ring 14 towards the center of measuring device 10, thereby defining an inner perimeter of the top side of ring 14. In an exemplary embodiment, inward portion 20 extends inwardly from the outer perimeter of ring 14 towards the center of measuring device 10, and defines a circular inner diameter of the top side of ring 14. Inward portion 20 of mounting shelf 16 may extend inwardly towards the center of measuring device 10 any appropriate distance.

As depicted in FIGS. 1, 3, 4 and 5, ring 14 further includes mating structures 18. Ring 14 includes at least three mating structures 18. In one embodiment, the at least three mating structures 18 are positioned adjacent to or near the bottom side of ring 14. The at least three mating structures 18 may take the form of ramped mating structures, although the present disclosure is not limited thereto. Rather, the at least three mating structures 18 may take a variety of forms.

Figure 4:
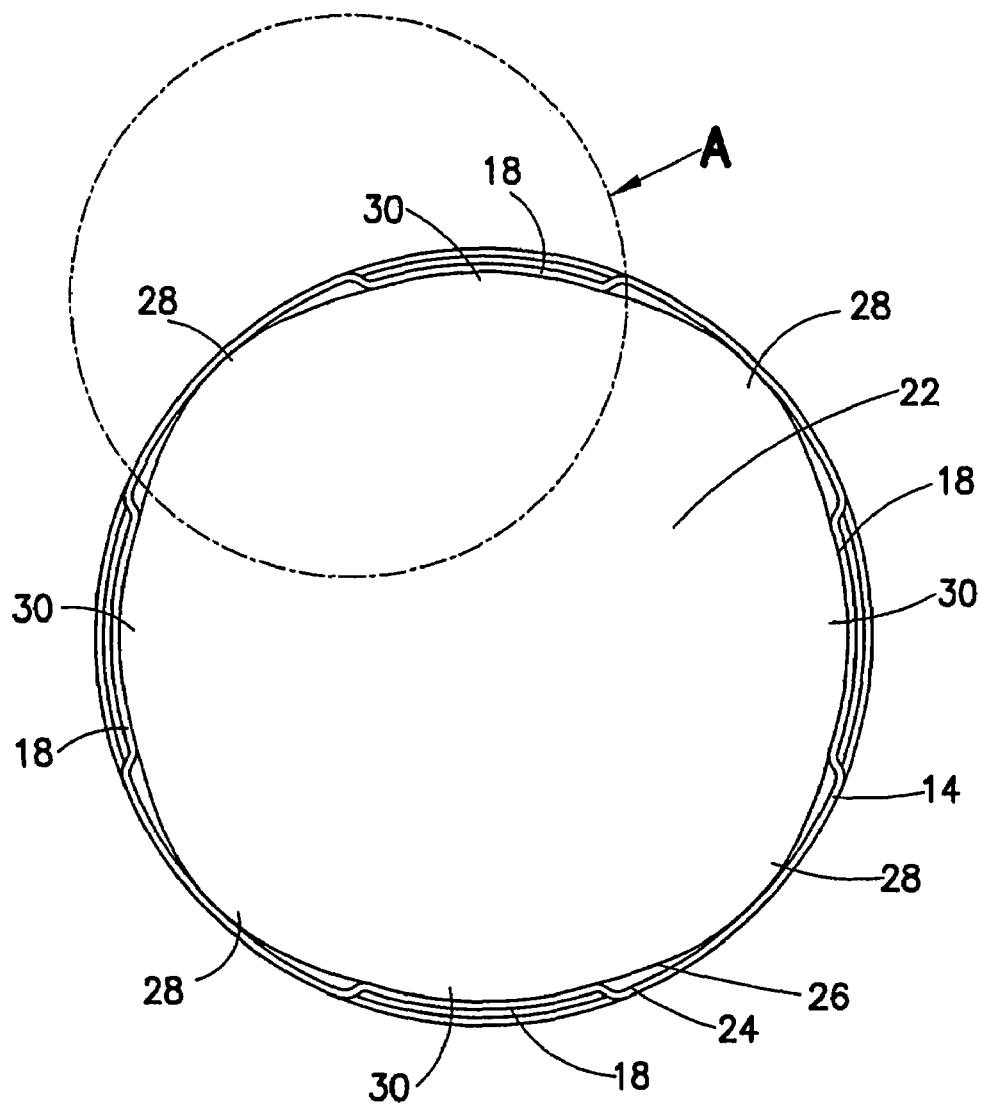
FIG. 4 is a bottom view of an exemplary embodiment of a window and ring according to the present disclosure, before assembly.

In one embodiment and as depicted in FIGS. 3 and 4, each of the at least three mating structures 18 are spaced apart from the other mating structures 18 at or near the bottom side of ring 14, thereby defining an inner perimeter 24 of the bottom side of ring 14. In one embodiment, each of the at least three mating structures 18 are spaced equidistantly apart from each adjacent mating structure 18 at or near the bottom side of ring 14, thereby defining an inner perimeter 24 of the bottom side of ring 14. In an exemplary embodiment and as shown in FIG. 4, ring 14 of measuring device 10 includes four mating structures 18. In one embodiment and as depicted in FIG. 4, the four mating structures 18 are spaced equidistantly apart from each adjacent mating structure 18 at or near the bottom side of ring 14, thereby defining an inner perimeter 24 of the bottom side of ring 14.

With reference to FIGS. 1 and 2, measuring device 10 includes a case 12. In general, case 12 is configured and dimensioned to house and protect the measuring device mechanism of measuring device 10. In one embodiment, case 12 is circular. Case 12 further includes at least three mating structures (not shown) that may be releasably secured to the at least three mating structures 18 of ring 14 when the ring 14 is releasably secured onto case 12. In one embodiment, the at least three mating structures of case 12 are positioned adjacent to or near the top side of case 12. The at least three mating structures of case 12 may take the form of ramped mating structures, although the present disclosure is not limited thereto. Rather, the at least three mating structures of case 12 may take a variety of forms.

In one embodiment, the at least three mating structures of case 12 are positioned adjacent to or near the top side of case 12 so that each of the at least three mating structures of case 12 align with and may be releasably secured to one of the at least three mating structures 18 of ring 14 when the ring 14 is releasably secured onto case 12. In one embodiment, the at least three mating structures of case 12 are spaced equidistantly apart from each adjacent mating structure of case 12 at or near the top side of case 12 so that each of the at least three mating structures of case 12 align with and may be releasably secured to one of the at least three mating structures 18 of ring 14 when the ring 14 is releasably secured onto case 12.

In an exemplary embodiment, case 12 of measuring device 10 includes four mating structures (not shown). In one embodiment, each of the four mating structures of case 12 are spaced radially apart from the other mating structures of case 12 at or near the top side of case 12 so that each of the four mating structures of case 12 align with and may be releasably secured to one of the mating structures 18 of ring 14 when the ring 14 is releasably secured onto case 12. In an exemplary embodiment, the four mating structures of case 12 are spaced equidistantly apart from each adjacent mating structure of case 12 at or near the top side of case 12 so that each of the four mating structures of case 12 align with and may be releasably secured to one of the mating structures 18 of ring 14 when the ring is releasably secured onto case 12 of measuring device 10.

Figure 5:
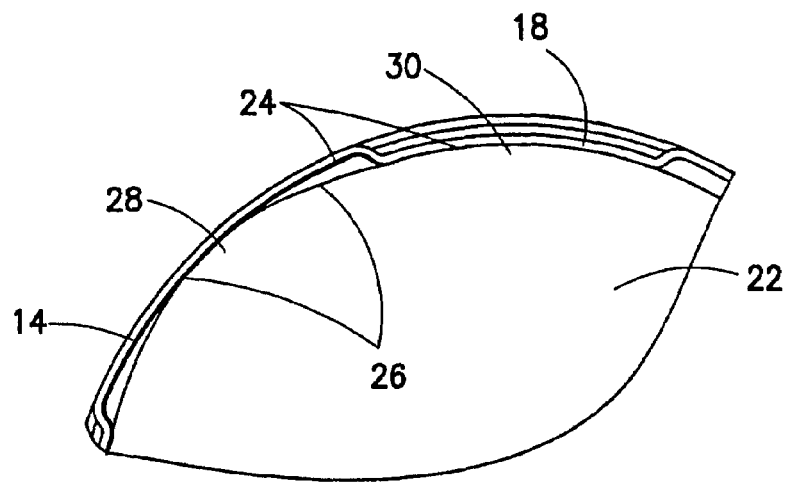
FIG. 5 is a partial exploded view of an exemplary embodiment of a window and ring taken substantially along section A of FIG. 4 according to the present disclosure.
Figure 7:
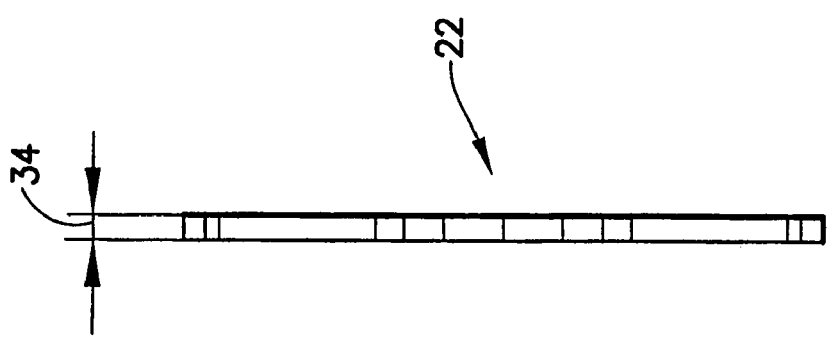
FIG. 7 is a side view of one embodiment of a window according to the present disclosure.

With reference to FIGS. 2, 4 and 5, measuring device 10 further includes a window element 22. Typically, window element 22 is planar. Exemplary window element 22 takes the form of a glass window element, although the present disclosure is not limited thereto. Rather, window element 22 may take a variety of forms, including without limitation, safety glass, tempered glass or the like. As shown in FIG. 7, window element 22 may be of any appropriate thickness 34. In one embodiment, window element 22 has a thickness 34 of about 0.135 inches.

Figure 6:
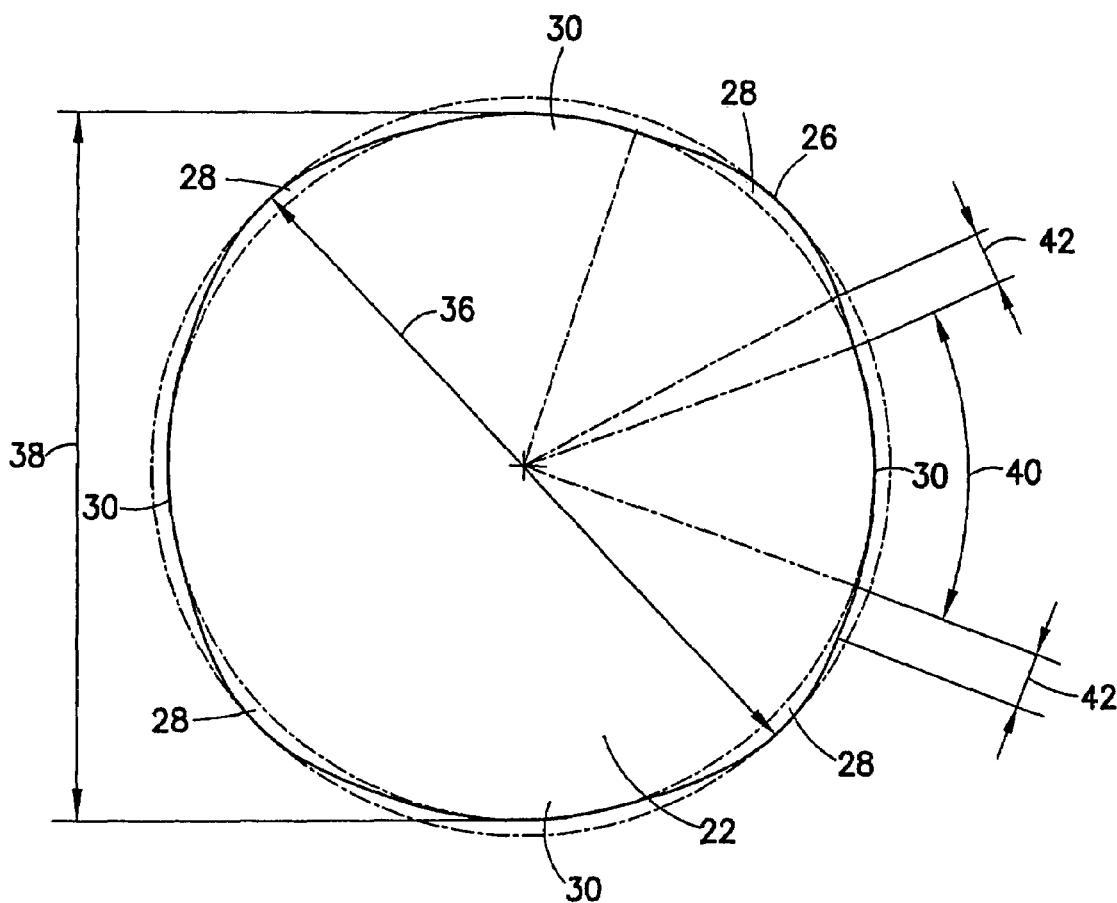
FIG. 6 is a top view of one embodiment of a window according to the present disclosure.
Figure 8:
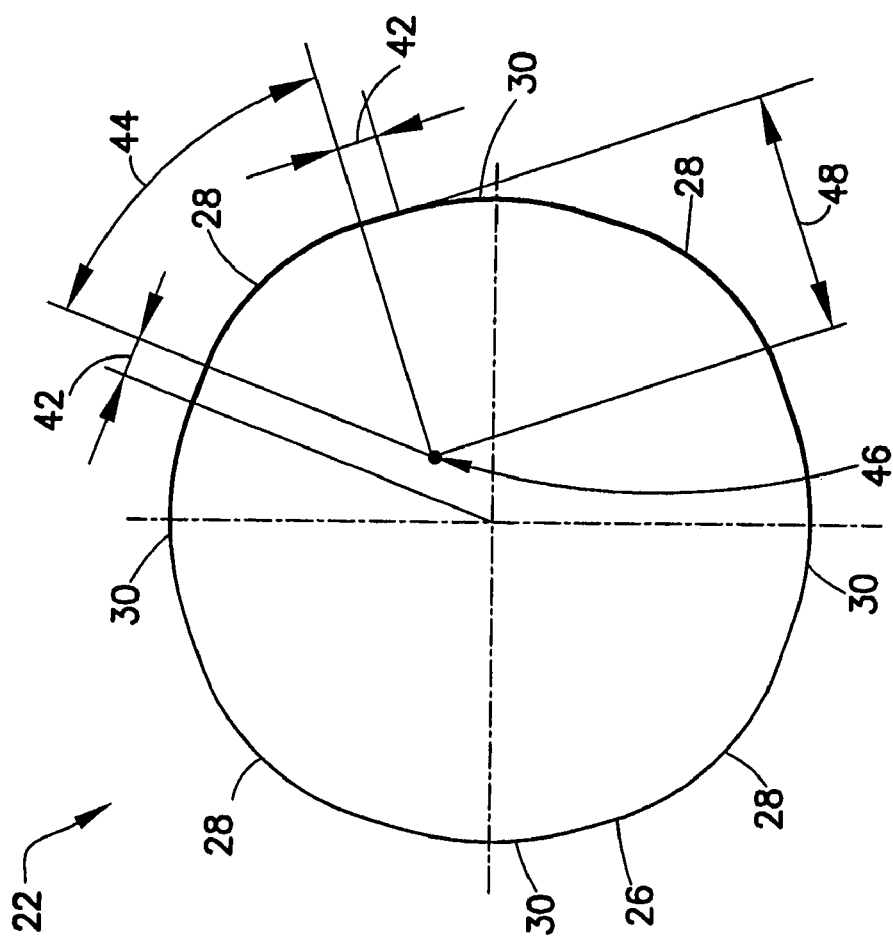
FIG. 8 is a top view of one embodiment of a window according to the present disclosure.

As depicted in FIGS. 4, 6 and 8, window element 22 is a non-circular window element that defines an outer perimeter 26, with the outer perimeter 26 including outwardly extending lobes 28 and radially inward recess regions 30 positioned between adjacent outwardly extending lobes 28. Window element 22 includes at least three outwardly extending lobes 28 and radially inward recess regions 30 positioned between adjacent lobes 28.

The outer perimeter 26 of window element 22 is sized to rest upon mounting shelf 16 of ring 14 once the window element 22 bypasses the inner perimeter 24 of ring 14. Each radially inward recess region 30 is configured and dimensioned to allow the window element 22 to bypass the at least three mating structures 18 of ring 14, and each lobe 28 is configured and dimensioned to allow each lobe 28 of window element 22 to be positioned substantially adjacent to the inner perimeter 24 of ring 14 when the window element 22 is rested upon mounting shelf 16 of ring 14. By positioning each lobe 28 substantially adjacent to the inner perimeter 24 of ring 14 when the window element 22 is rested upon mounting shelf 16 of ring 14, this provides that the window element 22 will not substantially move or shift in the ring 14 during or after assembly of the measuring device 10. Once window element 22 is so positioned upon mounting shelf 16, the window element 22 may be sealed between the mounting shelf 16 and the case 12 when the at least three mating structures of the case 12 are releasably secured to the at least three mating structures 18 of the ring 14.

In one embodiment and as depicted in FIG. 2, case 12 further includes gasketing material 32. In one embodiment, once the window element 22 is positioned upon mounting shelf 16, the window element 22 may be sealed between the mounting shelf 16 and the gasketing material 32 of case 12 when the at least three mating structures of the case 12 are releasably secured to the at least three mating structures 18 of the ring 14.

In one embodiment, the at least three outwardly extending lobes 28 are spaced equidistantly apart from each adjacent lobe 28 with the radially inward recess regions 30 positioned between adjacent lobes 28 so that the radially inward recess regions 30 are spaced equidistantly apart from each adjacent recess region 30. In an exemplary embodiment and as depicted in FIGS. 4 and 6, window element 22 includes four outwardly extending lobes 28 spaced equidistantly apart from each adjacent lobe 28 with the radially inward recess regions 30 positioned between adjacent lobes 28 so that the radially inward recess regions are spaced equidistantly apart from each adjacent recess region 30. In one embodiment, window element 22 is symmetric. In another embodiment and as depicted in FIGS. 4 and 6, all of the adjacent edges around the outer perimeter 26 of window element 22 are tangent and window element 22 is symmetric. In one embodiment and as shown in FIG. 6, window element 22 has a lobe diameter 36. As shown in FIG. 6, lobe diameter 36 is the distance across window element 22 from the outer most point on the outer perimeter 26 of window element 22 of a lobe 28 to the outer most point on the outer perimeter 26 of window element 22 of the lobe 28 positioned 180 degrees around window element 22. In one embodiment, window element 22 has a lobe diameter 36 of about 3.8 inches. In an alternative embodiment, window element 22 has a lobe diameter 36 of about 2.7 inches.

In an exemplary embodiment and as shown in FIG. 6, window element 22 further includes a recess region diameter 38. As depicted in FIG. 6, recess region diameter 38 is the distance across window element 22 from the inner most point on the outer perimeter 26 of window element 22 of a recess region 30 to the inner most point on the outer perimeter 26 of window element 22 of the recess region positioned 180 degrees around window element 22. In one embodiment, window element 22 has a recess region diameter 38 of about 3.7 inches. In an alternative embodiment, window element 22 has a recess region diameter 38 of about 2.6 inches.

In one embodiment and as depicted in FIG. 6, each recess region 30 of window element 22 includes a recess angular section 40. Recess angular section 40 of recess region 30 is configured and dimensioned to allow the window element 22 to bypass any one of the at least three mating structures 18 of ring 14. In one embodiment, the recess angular section 40 of each recess region 30 extends for 39 degrees around the outer perimeter 26 of window element 22. In an exemplary embodiment and as shown in FIG. 6, the center of window element 22 acts as the central axis for recess angular section 40. In one embodiment, when the center of window element 22 acts as the central axis for recess angular section 40, the length of the radius from the center of window element 22 to any point along recess angular section 40 is about one half of the length of recess region diameter 38. In one embodiment, the recess region diameter 38 is about the same distance across window element 22 from every point on the outer perimeter 26 along recess angular section 40 to the point on the outer perimeter 26 of window element 22 positioned 180 degrees around window element 22.

In an exemplary embodiment and as shown in FIGS. 6 and 8, window element 22 further includes straight sections 42 located on both sides of each recess angular section 40. In one embodiment, window element 22 includes eight straight sections 42. Each straight section 42 extends in a straight line from the end of each recess angular section 40 on the outer perimeter 26 of window element 22. In one embodiment, each straight section 42 extends in a straight line at a 90 degree angle from the recess region diameter 38 at the end of each recess angular section 40. In one embodiment, the length of each straight section 42 is about the same for every straight section 42 on the outer perimeter of window element 22. In one embodiment, the length of each straight section 42 on the outer perimeter 26 of window element 22 is about 0.20 inches. In an alternative embodiment, the length of each straight section 42 on the outer perimeter 26 of window element 22 is about 0.22 inches.

In one embodiment and as shown in FIG. 8, each lobe 28 of window element 22 includes a lobe angular section 44 having a lobe radius 48. Lobe angular section 44 of lobe 28 is configured and dimensioned to allow each lobe 28 of window element 22 to be positioned substantially adjacent to the inner perimeter 24 of ring 14 when the window element 22 is rested upon mounting shelf 16 of ring 14. In an exemplary embodiment, the lobe angular section 44 of each lobe 28 extends for 51 degrees around the outer perimeter 26 of window element 22, with axis point 46 acting as the central axis for lobe angular section 44. In one embodiment and as depicted in FIG. 8, each lobe angular section 44 extends around the outer perimeter 26 of window element 22 from the end of straight section 42 to the end of the adjacent straight section 42 of window element 22. As depicted in FIG. 8, the axis point 46 for lobe angular section 44 may be located inside window element 22 at the intersection point of lines drawn at a 90 degree angle from the ends of two adjacent straight sections 42. In an exemplary embodiment and as shown in FIG. 8, the axis point 46 for each lobe angular section 44 is located inside window element 22 at the intersection point of lines drawn at a 90 degree angle from the ends of each of the two straight section 42 that are adjacent to each lobe angular section 44. In one embodiment, the lobe diameter 36 is about the same distance across window element 22 from every point on the outer perimeter 26 along lobe angular section 44 to the point on the outer perimeter 26 of window element 22 positioned 180 degrees around window element 22.

In one embodiment of the present disclosure, window element 22 may be manufactured by punching window element 22 out of sheet glass. In an alternative embodiment, window element 22 may be manufactured by water-jet cutting window element 22 out of the starting glass material. In an exemplary embodiment of the present disclosure, the geometry of window element 22 is one continuous smooth curve, similar to the geometry of a round window. There are no high stress rising points of window element 22 that would make cracking more likely while punching out window element 22 or installing window element 22 into measuring device 10.

Tests have been made to demonstrate that the window element 22 seal achieved when the ring 14 is releasably secured onto the case 12 in accordance with the present disclosure are satisfactory. In one embodiment, after sealing window element 22 between the ring 14 and the case 12 in accordance with the present disclosure, the measuring device 10 was tested under a pressure of about 5 psi and there were no leaks.

One advantage to at least one embodiment of the present disclosure is that since the window element 22 is configured and dimensioned to not substantially move or shift during or after assembly of the measuring device, there is less risk that the measuring device will be returned to the manufacturer due to leakage issues and/or window cracking issues, thereby providing a cost and quality advantage as a result.

Another advantage to at least one embodiment of the present disclosure is that there are fewer features that have to be stamped into ring 14 as compared to some prior art rings. For example, some measuring devices stamp features into the ring in an attempt to not allow the window element to move or shift during or after assembly. Therefore, there is generally less manufacturing time required to manufacture the ring of the present disclosure as compared to a ring with such stamped features, thereby providing a cost advantage and allowing for a uniform round ring in the measuring device assembly as a result.

Another advantage to at least one embodiment of the present disclosure is that there are fewer filler parts that need to be utilized in the measuring device assembly as compared to some prior art measuring devices. For example, some measuring devices utilize an additional filler part in the measuring device assembly in an attempt to not allow the window to move or shift during or after assembly. Therefore, there are fewer additional filler parts needed to be utilized in the measuring device assembly of the present disclosure, thereby decreasing the cost and complexity of the measuring device assembly as a result.

Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the invention.

What is claimed is:

1. A measuring device system comprising:
    a case of a first measuring device that includes at least three first mating structures;
    a ring of the first measuring device that includes at least three second mating structures;
    a non-circular window element that defines an outer perimeter, the outer perimeter including at least three outwardly extending lobes and radially inward recess regions positioned between adjacent lobes;
    wherein at least the outer perimeter of the window element is sized to rest upon a mounting shelf associated with the ring;
    wherein each radially inward recess region is configured and dimensioned to allow the window element to bypass the at least three second mating structures associated with the ring; and
    wherein the at least three first mating structures of the case are releasably secured to the at least three second mating structures of the ring to releasably secure the ring to the case and to seal the window element between the mounting shelf and the case.

2. The measuring device system of claim 1, wherein the first measuring device is a pressure measuring device.

3. The measuring device system of claim 1, wherein the first measuring device is a temperature measuring device.

4. The measuring device system of claim 1, wherein the at least three first mating structures of the case are ramped mating structures, and wherein the at least three second mating structures of the ring are ramped mating structures.

5. The measuring device system of claim 1, wherein the case further comprises a gasketing material, and wherein the gasketing material forms a seal between the window element and the case when the at least three first mating structures of the case are releasably secured to the at least three second mating structures of the ring to releasably secure the ring to the case and to seal the window element between the mounting shelf and the case.

6. The measuring device system of claim 1, wherein the window element is glass.

7. The measuring device system of claim 1, wherein the ring defines an inner perimeter, and wherein each outwardly extending lobe is configured and dimensioned to allow each lobe to be positioned substantially adjacent to the inner perimeter of the ring when the window element is rested upon the mounting shelf of the ring.

8. The measuring device system of claim 1, wherein each outwardly extending lobe is spaced equidistantly apart from each adjacent lobe with the radially inward recess regions positioned between adjacent lobes so that the radially inward recess regions are spaced equidistantly apart from each adjacent radially inward recess region.

9. The measuring device system of claim 1, wherein the window element is symmetric.

10. The measuring device system of claim 1, wherein each outwardly extending lobe includes a lobe angular section and each radially inward recess region includes a recess angular section, and wherein the outer perimeter of the window element further comprises straight sections positioned between each lobe angular section of each outwardly extending lobe and each recess angular section of each radially inward recess region.

11. A method for manufacturing a measuring device system comprising:
    providing a case of a first measuring device that includes at least three first mating structures;
    providing a ring of the first measuring device that includes at least three second mating structures;
    providing a non-circular window element that defines an outer perimeter, the outer perimeter including at least three outwardly extending lobes and radially inward recess regions positioned between adjacent lobes, wherein at least the outer perimeter of the window element is sized to rest upon a mounting shelf associated with the ring, and wherein each radially inward recess region is configured and dimensioned to allow the window element to bypass the at least three second mating structures associated with the ring;

resting the outer perimeter of the window element upon the mounting shelf of the ring by bypassing the at least three second mating structures of the ring; and releasably securing the at least three first mating structures of the case to the at least three second mating structures of the ring, thereby releasably securing the ring to the case and thereby sealing the window element between the mounting shelf and the case.

12. The method of claim 11, wherein the first measuring device is a pressure measuring device.

13. The method of claim 11, wherein the first measuring device is a temperature measuring device.

14. The method of claim 11, wherein the at least three first mating structures of the case are ramped mating structures, and wherein the at least three second mating structures of the ring are ramped mating structures.

15. The method of claim 11, wherein the case further comprises a gasketing material, and wherein the gasketing material forms a seal between the window element and the case when the at least three first mating structures of the case are releasably secured to the at least three second mating structures of the ring to releasably secure the ring to the case and to seal the window element between the mounting shelf and the case.

16. The method of claim 11, wherein the window element is glass.

17. The method of claim 11, wherein the ring defines an inner perimeter, and wherein each outwardly extending lobe is configured and dimensioned to allow each lobe to be positioned substantially adjacent to the inner perimeter of the ring when the window element is rested upon the mounting shelf of the ring.

18. The method of claim 11, wherein each outwardly extending lobe is spaced equidistantly apart from each adjacent lobe with the radially inward recess regions positioned between adjacent lobes so that the radially inward recess regions are spaced equidistantly apart from each adjacent radially inward recess region.

19. The method of claim 11, wherein the window element is symmetric.

20. The method of claim 11, wherein each outwardly extending lobe includes a lobe angular section and each radially inward recess region includes a recess angular section, and wherein the outer perimeter of the window element further comprises straight sections positioned between each lobe angular section of each outwardly extending lobe and each recess angular section of each radially inward recess region.

* * * * *